United States Patent
Kim et al.

(10) Patent No.: US 8,867,433 B2
(45) Date of Patent: Oct. 21, 2014

(54) METHOD OF RETRANSMISSION TO REDUCE THE OVERHEAD

(75) Inventors: Jeong Ki Kim, Gyeonggi-do (KR); Ki Seon Ryu, Gyeonggi-do (KR); Doo Hyun Sung, Gyeonggi-do (KR); Wook Bong Lee, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 905 days.

(21) Appl. No.: 12/674,412

(22) PCT Filed: Aug. 13, 2008

(86) PCT No.: PCT/KR2008/004703
§ 371 (c)(1),
(2), (4) Date: Jun. 29, 2011

(87) PCT Pub. No.: WO2009/025466
PCT Pub. Date: Feb. 26, 2009

(65) Prior Publication Data
US 2011/0249630 A1    Oct. 13, 2011

(30) Foreign Application Priority Data

Aug. 22, 2007    (KR) .................. 10-2007-0084615

(51) Int. Cl.
*H04B 7/212*    (2006.01)
*H04L 1/00*    (2006.01)
*H04L 1/18*    (2006.01)

(52) U.S. Cl.
CPC ............ *H04L 1/0003* (2013.01); *H04L 1/1825* (2013.01); *H04L 1/0009* (2013.01); *H04L 1/0027* (2013.01); *H04L 1/0025* (2013.01)
USPC .......................................... 370/322; 370/330

(58) Field of Classification Search
CPC ... H04L 1/0003; H04L 1/0009; H04L 1/0025; H04L 1/0027; H04L 1/1825
See application file for complete search history.

(56) References Cited

U.S. PATENT DOCUMENTS 5,946,320 A    8/1999    Decker
7,593,486 B2 *    9/2009    Jeong et al. ............... 375/324
(Continued)

FOREIGN PATENT DOCUMENTS

JP    2000069547    3/2000
JP    2002186014    6/2002
(Continued)

OTHER PUBLICATIONS

Samsung, "HARQ Operation", Joint RAN WG1 and RAN WG2 on LTE, R2-0601000, Mar. 2006.
(Continued)

*Primary Examiner* — Marsha D Banks Harold
*Assistant Examiner* — Hooman Houshmand
(74) *Attorney, Agent, or Firm* — Lee, Hong, Degerman, Kang & Waimey (57) ABSTRACT

A method of transmitting data in a wireless access system and a packet retransmitting method therein are disclosed. The present invention includes receiving an initial control message including information required for a packet retransmission from a base station, transmitting the packet to be provided with a service from the base station, and if a NACK (non-acknowledgement) signal is received from the base station, retransmitting the packet corresponding to the NACK signal to the base station using the information required for the packet retransmission and included in the initial control message. Therefore, since a separate control message needs not to be transmitted in case of packet retransmission, it is able to save radio resources and reduce an overhead by retransmitting a packet via a previously allocated retransmission region without the separate control message.

12 Claims, 6 Drawing Sheets

(56) References Cited

U.S. PATENT DOCUMENTS

| | | | |
|---|---|---|---|
| 8,160,006 B2* | 4/2012 | Chang et al. | 370/329 |
| 2002/0001296 A1 | 1/2002 | Lee et al. | |
| 2002/0046379 A1* | 4/2002 | Miki et al. | 714/749 |
| 2003/0072292 A1* | 4/2003 | Yoon et al. | 370/342 |
| 2003/0206559 A1* | 11/2003 | Trachewsky et al. | 370/509 |
| 2004/0199846 A1* | 10/2004 | Matsumoto et al. | 714/748 |
| 2005/0018644 A1* | 1/2005 | Gessner et al. | 370/349 |
| 2005/0032522 A1* | 2/2005 | Soong et al. | 455/450 |
| 2005/0201325 A1* | 9/2005 | Kang et al. | 370/328 |
| 2006/0013156 A1* | 1/2006 | Miyoshi et al. | 370/328 |
| 2007/0217531 A1* | 9/2007 | Kwon et al. | 375/260 |
| 2008/0205452 A1* | 8/2008 | Chou | 370/493 |

FOREIGN PATENT DOCUMENTS

| | | |
|---|---|---|
| JP | 2006203337 | 8/2006 |
| KR | 1020030087882 | 11/2003 |
| KR | 1020040050422 | 6/2004 |
| WO | 2006/071049 | 7/2006 |
| WO | 2006/114689 | 11/2006 |

OTHER PUBLICATIONS

Nokia, et al., "Stage 3 Aspects of Semi-Persistent Scheduling", 3GPP TSG-RAN WG2 Meeting #58bis, R2-072401, Jun. 2007.

LG Electronics, "Consideration on UL HARQ", 3GPP TSG-RAN WG2 #58bis, R2-072741, Jun. 2007.

* cited by examiner

☒R1☒: Region for retransmission of P1
☒R2☒: Region for retransmission of P2
☒R3☒: Region for retransmission of P3
☒R4☒: Region for retransmission of P4

FIG. 4

☒R1☒: Region for retransmission of P1, P2
☒R2☒: Region for retransmission of P3, P4

FIG. 5

☒ R1: Region for retransmission of P1, P2
☒ R2: Region for retransmission of P3, P4
  R2 includes R1 region

METHOD OF RETRANSMISSION TO REDUCE THE OVERHEAD

CROSS-REFERENCE TO RELATED APPLICATIONS

This application is the National Stage filing under 35 U.S.C. 371 of International Application No. PCT/KR2008/004703, filed on Aug. 13, 2008, which claims the benefit of earlier filing date and right of priority of Korean Patent Application No. 10-0084615, filed on Aug. 22, 2007.

TECHNICAL FIELD

The present invention relates to a method of transmitting data in a wireless access system, and more particularly, to various packet retransmission methods in the data transmitting method.

BACKGROUND ART

In the following description, explained is a method of transmitting packets in terminals that use IP based voice over internet protocol (hereinafter abbreviated 'VoIP') in a broadband wireless access system. For this, VoIP traffic is described as follows. Yet, a packet transmitting method according to the present invention needs not to be limited to the VoIP packet transmission described in the following.

First of all, VoIP traffic is characterized in being generated in a fixed size with a fixed period in VoIP codec. And, VoIP communication can be divided into a talk period (talk-spurt), for which inter-user call is in progress, and a silence period for which a user is not talking but listening. In general, the silence period occupies over 50% in a whole call session.

In order to allocate bandwidths differing in size to the talk-spurt and the silence period, various kinds of audio codecs are used. A representative one of the various kinds of audio codecs is AMR (adaptive multi-rate) scheme used by GSM (global system for mobile communication) or UMTS (universal mobile telecommunication system).

Since voice data is not generated for the silence period, if a bandwidth is allocated to the silence period, it may bring about a resource waste. To prevent the resource waste, VoIP supports a silence suppression scheme. According to the silence suppression scheme, a vocoder for generating VoIP traffic does not generate traffic for the silence period and periodically generates a comfort noise to inform a correspondent user that a call keeps being maintained. For instance, a vocoder, which uses the AMR codec, generates a packet in a fixed size once per 20 ms for a talk-spurt or generates a comfort noise per 160 ms.

Meanwhile, for resource allocation to the traffic having a predetermined period in a fixed size like VoIP in general, a base station is able to use a method of allocating a designated region to a specific terminal fixedly. Namely, a region having an initially determined size is allocated to a terminal supporting the VoIP service. And, it is able to inform the terminal of the allocated region information via an initially transmitted control channel or message (e.g., UL-MAP or DL-MAP). Thus, the initially transmitted control channel or message can contain period information of a region that will be allocated in the future as well.

Subsequently, for a next period, the base station is able to keep allocating the corresponding region having been notified to the terminal via the initially transmitted control channel or message without a special notice. Therefore, the terminal transmits VoIP packets via the allocated region using the region information allocated by a MAP in the early stage and then transmits VoIP packets via the same region from a next period using period information.

Assume that a length of a frame is set to 5 ms to consider a VoIP service. And, assume that a frame period allocated to a terminal for VoIP packet transmission is set to 4 frames. In this case, a frame period allocated to a terminal for VoIP packet transmission may vary according to characteristics of a service. In particular, in case of a same VoIP service, the frame period allocated for the VoIP packet transmission may be used by being defined different according to the respective consideration factors such as system characteristics (e.g., a system characteristic according to a frame length), a VoIP service status (e.g., a talk-spurt, a silence period) and the like.

In an initial frame, a base station notifies a terminal of allocated region information for VoIP packet transmission via UL-MAP. Thereafter, in a fourth frame or an eighth frame corresponding to each period, the base station does not announce region information via the UP-MAP but allocates a region for the VoIP packet transmission only.

In this case, a period allocated for the VoIP packet transmission corresponds to four frames (i.e., 20 ms). In particular, the terminal keeps storing the region allocation information contained in the UL-MAP received in the initial frame and is then able to transmit a VoIP packet via a corresponding region if there is not reception of UL-MAP in the fourth or eighth frame. Thus, the base station is able to allocate the resource for a single VoIP connection fixedly and constantly due to the VoIP traffic characteristics.

In the following description, briefly described is a method of transmitting data between a transmitting side and a receiving side. In a data transmitting method, if a transmission failure occurs, a receiving side makes a retransmission request for corresponding data. In this case, ARQ (automatic repeat request) scheme is generally used as a data retransmission scheme.

In the ARQ scheme, an acknowledgement/non-acknowledgement (hereinafter abbreviated ACK/NACK) signal indicating whether a receiving side correctly receives data is notified to a transmitting side. The receiving side then retransmits the data for the corresponding signal in case of receiving the NACK signal. The ARQ scheme can be categorized into SAW (stop-and-wait) ARQ, GBN (go-back-N) ARQ and SR (selective-repeat) ARQ.

In the SAQ ARQ scheme, a transmitting side waits after data transmission until receiving ACK or NACK signal. If the ACK signal is received, the transmitting side newly transmits next data. If the NACK signal is received, the transmitting side retransmits the previous data. Namely, the SAW ARQ scheme is a scheme for transmitting a single frame at a time only. If it is confirmed that a corresponding frame is successfully delivered, a next frame is transmitted.

The GBN ARQ scheme is a scheme for continuously transmitting data regardless of a response message. In case that a receiving side fails to receive data of a specific frame in the course of receiving data, the receiving side is unable to transmit an ACK signal for the specific frame to a transmitting side. Since the transmitting side is unable to receive the ACK signal for the specific frame, the transmitting side retransmits data from the data of the specific frame.

In the SR ARQ scheme, while data keeps being transmitted, data corresponding to a received NACK signal is retransmitted only. If a receiving side fails to receive data of a specific frame, the receiving side transmits a NACK signal to a transmitting side. The transmitting side having received the NACK signal then retransmits the data of the frame indicated by the NACK signal to the receiving side to transmit the whole data. Since the SR ARQ scheme gives a sequence to each frame and manages it, the implementation of the SR ARQ scheme may becomes complicated relatively.

In the scheme for transmitting data in packet format, as a higher data rate becomes necessary, a coding rate or a modulation scheme, which has a suitable level to prevent error generated in high-speed transmission environment, is applied to a communication system. And, ARQ scheme suitable for the high-speed transmission environment, i.e., Hybrid ARQ (hereinafter abbreviated HARQ) has been proposed.

In the ARQ scheme, if error is generated, the corresponding information is discarded. Yet, in the HARQ scheme, a receiving side stores erroneous information in s buffer. The receiving side combines the stored information with retransmitted information and then applies FEC (forward error correction) thereto. Namely, the HARQ scheme may be regarded as the scheme generated from combining the ARQ scheme with the FEC. The HARQ can be mainly categorized into the following four types.

In a first type HARQ scheme, a receiving side always checks an error detection code in data and then primarily applies FEC thereto. If error still remains in a packet, the receiving side makes a request for a retransmission to a transmitting side. The receiving side discards an erroneous packet. The transmitting side then retransmits a packet by applying the same FEC code of the discarded packet to the retransmitted packet.

Second type HARQ scheme is called IR (incremental redundancy) ARQ scheme. In the second type HARQ scheme, a receiving side stores a first transmitted packet in a buffer instead of discarding it and then combines it with retransmitted redundancy bits. In case of retransmission, a transmitting side retransmits parity bits only except data bits. Each time the parity bits are retransmitted by the transmitting side, different ones are used.

A third type HARQ scheme corresponds to a special case of the second type HARQ scheme. Each packet is self-decodable. In case that a transmitting side performs retransmission, the transmitting side configures a packet containing an erroneous part and data together and then retransmits the corresponding packet. Although this scheme enables decoding more accurate than the second type HARQ scheme, it has efficiency poorer than that of the second type HARQ scheme in aspect of coding gain.

In a fourth type HARQ scheme, a function of combining the data initially received and stored by a receiving side with retransmitted data is added to a function of the first type HARQ scheme. And, the fourth type HARQ scheme may be called a matrix combining scheme or a chase combining scheme. Moreover, the fourth type HARQ scheme has a gain in aspect of SINR (signal to interference noise ratio) and always uses the same parity bits of the retransmitted data.

In case that error is generated in data transmission or data is lost in the data transmission, the above-described data transmitting methods enable reconstruction of original data.

DISCLOSURE OF THE INVENTION

Technical Problem

However, in case that transmission/reception of packets is frequently required like VoIP, it becomes highly probable that error is generated from the transmitted/received packets. Since the number of transmissions for control messages to allocate new resource regions and the like is incremented, an overhead is increased in a MAC layer.

Technical Solution

Accordingly, the present invention is directed to a method of transmitting data in a wireless access system that substantially obviates one or more of the problems due to limitations and disadvantages of the related art.

An object of the present invention is to provide a method of transmitting data, by which data can be efficiently transmitted.

Another object of the present invention is to provide a method of reducing a message overhead in case that packet retransmissions are frequently necessary.

Another object of the present invention is to provide a method of reducing an overhead generated from retransmitting an erroneous packet for continuously transmitted VoIP packets and the like.

Another object of the present invention is to provide a method of allocating a retransmission region to an least one mobile station, by which data processing efficiency can be raised despite that VoIP packet is transmitted to a plurality of mobile stations.

A further object of the present invention is to provide a method of allocating a new retransmission region instead of a previously allocated retransmission region if error keeps being generated despite that a retransmission packet is transmitted by allocating a fixed transmission region, by which efficiency in processing data can be raised.

Therefore, the present invention relates to a data transmitting method in a wireless access system and a packet retransmission method in a wireless access system. And, in case that frequent packet transmissions/receptions are necessary, methods for efficiently using resources by reducing a control overhead are disclosed.

Additional features and advantages of the invention will be set forth in the description which follows, and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, a method of retransmitting a packet in a wireless access system according to the present invention includes receiving an initial control message including information required for a packet retransmission from a base station, transmitting the packet to be provided with a service from the base station, and if a NACK (non-acknowledgement) signal is received from the base station, retransmitting the packet corresponding to the NACK signal to the base station using the information required for the packet retransmission and included in the initial control message.

Preferably, the information required for the packet retransmission includes information for allocating different resource allocation regions required for the packet transmission to at least one or more terminals, respectively.

Preferably, the information required for the packet retransmission includes information for configuring at least one group including terminals having resource allocation regions equal to each other in size among at least one or more terminals and for allocating a resource allocation region required for the packet retransmission to the at least one group.

Preferably, the information required for the packet retransmission includes information for setting a retransmission dedicated channel for the packet retransmission of at least one terminal and on a specific region required for the packet retransmission in the retransmission dedicated channel.

To further achieve these and other advantages and in accordance with the purpose of the present invention, a method of retransmitting a packet in a wireless access system includes the steps of transmitting an initial control message including information required for a packet retransmission to at least one terminal, providing a service to the at least one terminal, and if a NACK (non-acknowledgement) signal is received from the at least one terminal, retransmitting the packet corresponding to the NACK signal to the at least one terminal using the information required for the packet retransmission and included in the initial control message.

Preferably, the method further includes the step of if the base station receives the NACK signal repeatedly over a prescribed count, transmitting a control signal to the at least one terminal by updating the information required for the packet retransmission and then including the updated information in the control message for the packet retransmission.

It is to be understood that both the foregoing general description and the following detailed description are exemplary and explanatory and are intended to provide further explanation of the invention as claimed.

Advantageous Effects

Accordingly, the present invention provides the following effects or advantages.

First of all, data communication can be efficiently performed using the embodiments of the present invention.

Secondly, in case that frequent packet retransmissions are necessary, a fixed retransmission region can be allocated to a mobile station via an initial control message instead of allocating a retransmission region each time. In particular, if it becomes necessary to perform a retransmission, it is able to retransmit a packet via a previously allocated retransmission region without a separate control message. Therefore, since an additional and separated control message needs not to be transmitted in case of packet retransmission, it is able to save radio resources and reduce an overhead.

Thirdly, in case that frequent packet transmissions/receptions are necessary like VoIP service, the present invention is able to reduce an overhead generated from retransmitting an erroneous packet.

Fourthly, by allocating a retransmission region to each of at least one or more mobile stations, packets can be quickly retransmitted via the allocated resource region in case that the mobile stations perform retransmissions. Therefore, efficient data processing is enabled.

And, at least one or more mobile stations having the same attributes are grouped together and a retransmission region is then allocated per group. Therefore, it is able to save radio resources.

Moreover, by allocating a dedicated retransmission channel for a plurality of mobile stations, it is able to perform more efficient retransmission.

Fifthly, despite that packets are transmitted by allocating a fixed retransmission region, if errors keep being generated from the packets, a new retransmission region is allocated instead of a previously allocated retransmission region. Therefore, it is able to effectively cope with the repeatedly generated errors.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

In the drawings.

BEST MODE

Mode for Invention

Reference will now be made in detail to the preferred embodiments of the present invention, examples of which are illustrated in the accompanying drawings.

To solve the above-mentioned technical problem, the present invention provides an efficient data transmitting method in a wireless access system and an efficient packet retransmitting method therein. Moreover, the present invention provides a packet transmitting method to use resources efficiently by reducing a control overhead of a MAC layer in case that frequent packet transmission/receptions are necessary.

The following embodiments are implemented by combining the elements and features of the present invention in specific forms, respectively. Each of the elements or features can be considered selective if there is no separate explicit description. Each of the elements or features can be implemented without being combined with another one. And, an embodiment of the present invention can be configured by combining the elements and/or features in part. The order or sequence of the operations mentioned in the descriptions of the embodiments of the present invention may be changed. Configurations or features of one of the embodiments can be partially included in another or can be replaced by corresponding configurations or features of another embodiment.

In the description of the drawings, procedures or steps, which may dilute the gist or substance of the present invention, are not described. And, procedures or steps understandable on a level for those skilled in the art are not described as well.

In this disclosure, embodiments of the present invention are described centering on data transceiving relation between a base station and a terminal. In this case, the base station has the meaning as a terminal node of a network for performing communication directly with the terminal. In this disclosure, a specific operation or action described as performed by a base station can be performed by an upper node of the base station.

Namely, various operations performed for communication with a terminal in a network constructed with a plurality of network nodes and a base station can be performed by the base station or the network nodes except the base station. In this case, the 'base station' can be replaced by such a terminology as a fixed station, a Node B, an eNode B (eNB), an access point and the like. And, 'mobile station' can be replaced by such a terminology as a user equipment (UE), a subscriber station (SS), a mobile subscriber station (MSS), a mobile terminal and the like.

A transmitting end means a node for transmitting data or a voice service and a receiving end means a node for receiving data or a voice service. Hence, a terminal and a base station can become a transmitting end and a receiving end in uplink, respectively. Likewise, a terminal and a base station can become a receiving end and a transmitting end in downlink, respectively.

Meanwhile, a mobile station of the present invention can include one of a personal digital assistant (PDA), a cellular phone, a personal communication service (PCS) phone, a GSM (global system for mobile) phone, a wideband CDMA (WCDMA) phone, a mobile broadband system (MBS) phone and the like.

Embodiments of the present invention can implemented through diverse means. For instance, embodiments of the present invention can be implemented through hardware, firmware, software or any combination thereof.

In case of the implementation by hardware, methods according to the present invention can be implemented at least one selected from the group consisting of ASICs (application specific integrated circuits), DSPs (digital signal processors), DSPDs (digital signal processing devices), PLDs (programmable logic devices), FPGAs (field programmable gate arrays), a processor, a controller, a microcontroller, a microprocessor and the like.

In case of the implementation by firmware or software, methods according to embodiments of the present invention can be implemented by a module, procedure or function for performing the above-mentioned functions or operations. Software code is stored in a memory unit and can be driven by a processor. In this case, the memory unit is placed within or outside the processor and is able to transceive data with the processor by various means which are already known in public.

Embodiments according to the present invention can be supported by at least one documents disclosed for at least one of wireless access systems (e.g., IEEE 802 system, 3GPP system, 3GPP LTE system, 3GPP2 system). In particular, the document of IEEE 802.16e Rev2_D4 (April 2008) is able to sufficiently support the embodiments according to the present invention.

Specific terminologies used in the following description are provided to help the understanding of the present invention. And, the usages of the specific terminologies can be modified into other forms within the scope not departing from the technical idea of the present invention.

In the following description, VoIP packet transmission among services, for which frequent packet retransmissions are required, is taken as an example for one preferred embodiment of the present invention.

According to one preferred embodiment of the present invention, in case of setting a continuous resource allocating method for VoIP packet transmission, a base station enables continuous resource allocation information for retransmission to be included in an initial control message and then provides the information to a mobile station in advance. In uplink, the mobile station is able to transmit a packet and the like to the base station via the retransmission region in case that a retransmission occurs in the base station. In downlink, the base station is able to transmit a retransmission packet to the mobile station based on information for retransmission included in the initial control message provided to the mobile station.

The initial control message may be usable for various kinds of systems. In particular, the IEEE 802.16 system is able to use MAP IE (MAP information element) contained in a MAP message, a MAC management message or the like as the initial control message.

When a mobile station performs handover in entering a network of a base station, an initial control message is usable in the course of setting an interconnection. An initial control message may be a control message initially provided when a base station and a mobile station generate a new service. Namely, an initial control message may be a control message for allocation to transmit a first VoIP packet. Moreover, when a service is provided for a talk-spurt after a silence period, an initial control message is usable as well. And, it is understood that other control messages is usable as an initial control message as well as the above-described message.

As an example for one of various MAC management messages, there are dynamic service addition messages (e.g. DSA-REQ or DSA-RSP), channel descriptor messages (e.g. UCD or DCD), Subscriber Station basic capability messages (e.g. SBC-REQ or SBC-RSP) or the like. Besides, by non-limiting various examples for the above-described messages, various MAC management messages are available according to system requirements.

In particular, in case of providing a VoIP service to a mobile station initially, a base station is able to transmit informations required for retransmission to the mobile station using such a downlink control message as DL-MAP IE, UL-MAP IE or the like. When a base station initially provides a VoIP service to a mobile station, the base station and the mobile station can negotiate informations relevant to retransmission.

The information required for retransmission can contain fixed resource allocation information for retransmission, MCS (modulation and coding scheme level) information, a retransmission timing point (e.g., information for determining that a retransmission will be performed in a prescribed frame after receiving a NACK signal) or the like.

For the information required for retransmission, even if a mobile station and a base station transceiver packets via a pre-designated resource allocation region, if a NACK signal keeps being generated, the base station is able to allocate a radio resource region for a new retransmission by transmitting a control message for the new retransmission to the mobile station after having received a prescribed number of NACK signals. In this case, the prescribed number of NACK signals may vary according to a requirement of a system. In preferred embodiments of the present invention, a case of consecutively receiving NACK signals twice is taken as an example to be described in the following description.

In the following preferred embodiments of the present invention, a region previously allocated for retransmission is used only if the retransmission is generated only. If the retransmission is unnecessary, the previously allocated region is usable to transmit other general messages. This is to reduce waste of radio resources that may be generated when a specific region is unnecessarily secured unnecessarily.

In the process for transceiving VoIP packets between a base station and a mobile station, if a retransmission is generated in downlink, the base station transmits a retransmission packet via a pre-designated resource region. The mobile station is then able to receive the packet based on information about a pre-designated region for the retransmission.

If a retransmission is generated in uplink, the mobile station transmits a retransmission packet via a fixed resource region pre-allocated by the base station. The base station is then able to receive the packet via a pre-designated region. In particular, if error is generated from a packet having been retransmitted, a retransmission is performed using the same method (using a region allocated in the early time of a specific frame after completion of receiving NACK) of the initial retransmission. Alternatively, when the base station performs a retransmission using region information for the retransmission, the base station is able to inform the mobile station of the error generation using a control message.

In the preferred embodiments of the present invention, 'the error generation from a packet' includes a case that a mobile station or a base station is unable to receive a packet lost on a wireless/wire line as well as a case that error is generated from a transmitted or received packet itself. And, 'the error generation from a packet' also includes a case that a mobile station or a base station is unable to reconstruct an erroneous packet into an original packet.

In the following description, explained is a retransmission method used in a MAC layer.

Figure 1:
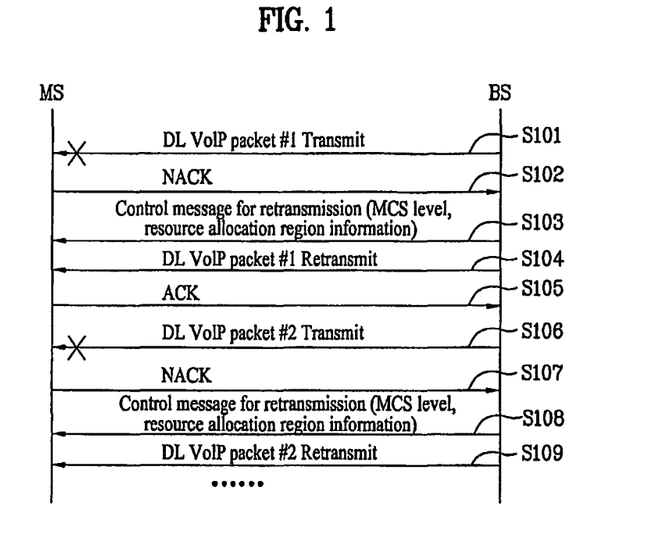
FIG. 1 a flowchart for an embodiment of using HARQ in transmitting VoIP packets in downlink.

FIG. 1 a flowchart for an embodiment-of using HARQ in transmitting VoIP packets in downlink.

Referring to FIG. 1, a method of transmitting VoIP packets to provide a VoIP service from a base station (BS) to a mobile station (MS) can be observed. When the base station BS transmits a DL VoIP packet #1 in downlink, as error is generated or the DL VoIP packet #1 is lost on wireless/wire line, if the mobile station is unable to receive the DL VoIP packet #1 [S101], the mobile station transmits a NACK signal to the base station [S102].

In this case, in order to retransmit the DL VoIP packet #1 having been transmitted to the mobile station in the step S101, the base station transmits a control message for retransmission by enabling new MCS (modulation and coding scheme) level information and new resource allocation region information to be included in the control message [S103].

The base station, which allocates a new resource region by transmitting the control message to the mobile station, retransmits the DL VoIP packet #1 to the mobile station via the newly allocated resource region [S104]. If the mobile station normally receives the packet in the step S104, the mobile station transmits an ACK signal to the base station [S105].

In order to provide the VoIP service continuously, the base station transmits a next VoIP packet, i.e., a DL VoIP packet #2 to the mobile station. Yet, if the DL VoIP packet #2 is erroneous or lost on wire/wireless line in the course of reception, the mobile station is unable to receive the packet normally [S106]. The mobile station failing to receive the VoIP packet normally transmits a NACK signal to the base station [S107].

Having received the NACK signal from the mobile station in the step S107, the base station transmits a control message for retransmission to the mobile station by enabling MCS level and resource allocation region information to be included in the control message [S108]. In the step S108, the mobile station is able to receive data via a new resource region allocated using the informations included in the control message for the retransmission.

The base station then retransmits the DL VoIP packet #2 corresponding to the NACK signal received in the step S107 to the mobile station [S109].

Figure 2:
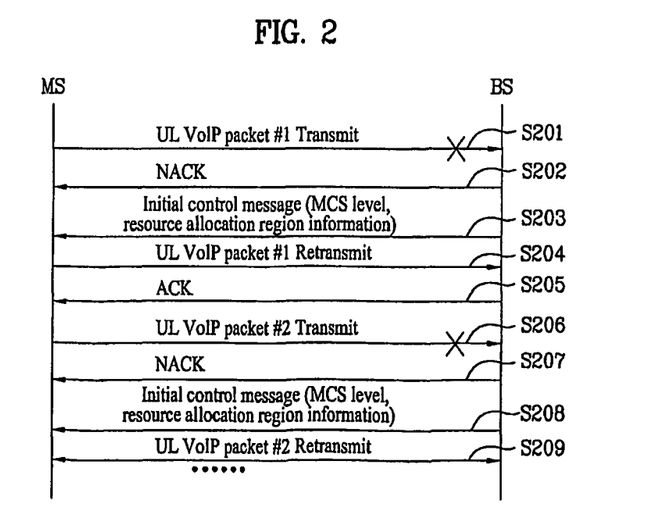
FIG. 2 a flowchart for an embodiment of using HARQ in transmitting VoIP packets in uplink.

FIG. 2 a flowchart for an embodiment of using HARQ in transmitting VoIP packets in uplink.

Referring to FIG. 2, a method of transmitting VoIP packets to provide a VoIP service to a base station (BS) from a mobile station (MS) can be observed. When the mobile station MS transmits a UL VoIP packet #1 in uplink, as error is generated or the DL VoIP packet #1 is lost on wireless/wire line, if the base station is unable to receive the DL VoIP packet #1 [S201], the base station transmits a NACK signal to the mobile station [S202].

In this case, in order to receive the erroneous UL VoIP packet #1 in the step 2101, the base station transmits a control message for retransmission to the mobile by enabling a new MCS (modulation and coding scheme) level and new resource allocation region information to be included in the control message [S203].

The mobile station has a new resource region allocated thereto by receiving the control message for the retransmission and then retransmits the UL VoIP packet #1 to the base station via the newly allocated resource region [S204]. If the base station normally receives the packet in the step S204, the base station transmits an ACK signal to the mobile station [S205].

In order to receive the VoIP service continuously, the mobile station transmits a next VoIP packet, i.e., a UL VoIP packet #2 to the base station. Yet, if the UL VoIP packet #2 is erroneous or lost on wire/wireless line in the course of reception, the base station may be unable to receive the packet normally [S206]. The base station failing to receive the VoIP packet normally transmits a NACK signal to the mobile station [S207].

Having transmitted the NACK signal to the mobile station in the step S207, the base station transmits a control message for retransmission to the mobile station by enabling MCS level and resource allocation region information different from the former information provided in the step S203 to be included in the control message [S208]. In the step S208, the mobile station is able to transmit data via a new resource region allocated using the informations included in the control message for the retransmission.

The mobile station then retransmits the UL VoIP packet #2 corresponding to the NACK signal received in the step S207 to the base station [S209].

As mentioned in the foregoing description of FIG. 1 and FIG. 2, in order for the base or mobile station to perform the retransmission of the erroneous packet, the base station repeatedly transmits the control message (e.g., MAP IE) including the new resource allocation region information (or MCS level information) for the retransmission to the mobile station each time the error is generated.

Figure 3:
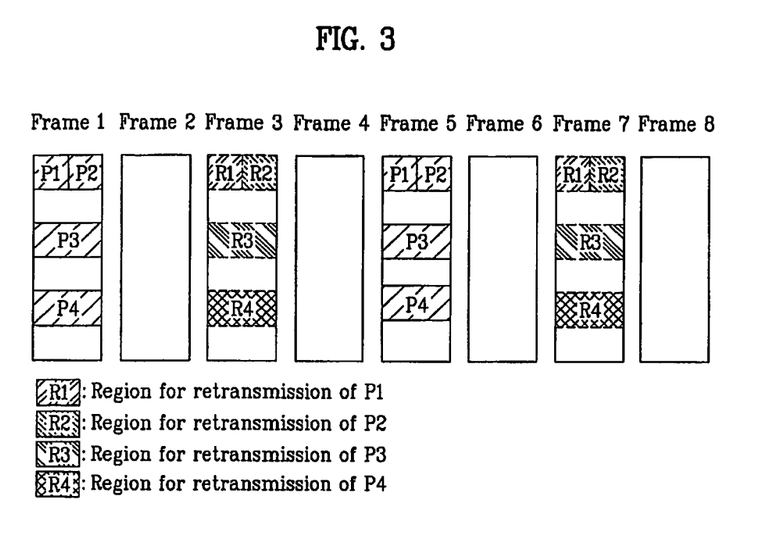
FIG. 3 is a diagram for a method of allocating a fixed radio resource region for retransmission from a base station to a mobile station according to one embodiment of the present invention.

FIG. 3 is a diagram for a method of allocating a fixed radio resource region for retransmission from a base station to a mobile station according to one embodiment of the present invention.

In FIG. 3, a horizontal axis indicates a time unit as a frame unit and a vertical axis indicates a frequency unit. 'P1' in Frame 1 or Frame 5 indicates a region allocated to a first mobile station by a base station for a continuous VoIP packet transmission/reception to/from the first mobile station in downlink/uplink. 'P2' indicates a radio resource region allocated to a second mobile station, 'P3' indicates a radio resource region allocated to a third mobile station, and 'P4' indicates a radio resource region allocated to a fourth mobile station.

Referring to FIG. 3, the base station allocates a region for retransmission to each mobile station having a VoIP connection by identifying the corresponding mobile station one by one. In downlink, the base station transmits a VoIP packet to the mobile station via the allocated region. In uplink, the mobile station transmits a VoIP packet to the base station via the allocated region. In particular, the first mobile station transmits VoIP packets with the base station via P1. And, the rest of the mobile stations transmit/receive VoIP packets to/from the base station via the allocated regions, respectively.

In Frame 3 or Frame 7, 'R1' indicates a region allocated for retransmission to correspond to P1, 'R2' indicates a region allocated for retransmission to correspond to P2, 'R3' indicates a region allocated for retransmission to correspond to P3, and 'R4' indicates a region allocated for retransmission to correspond to P4. The base station enables informations for retransmission to be included in an initial control message and is then able to transmit the control message to each of the mobile stations. Hence, if a retransmission takes place, the base station and the mobile stations can transmit the retransmitted packets with each other via the preset retransmission regions. In particular, in case that error is generated from the VoIP packet transmitted between the base station and each of the mobile stations via P1/P2/P3/P4, the base station and each of the mobile stations can transmit the retransmitted packet via the pre-allocated radio resource region R1/R2/R3/R4.

Even if error is not generated in the course of transmitting packets between one of the first to fourth mobile stations and the base station, keeping the pre-allocated region for retransmission will be a waste of radio resources. Hence, if the retransmission is unnecessary, the pre-allocated region for the retransmission can be used to transmit a different packet of each of the mobile stations or packet of the base station. This agreement can be established through mutual negotiation in case that the base station and the mobile station are interconnected to each other or an initial service is provided.

Figure 4:
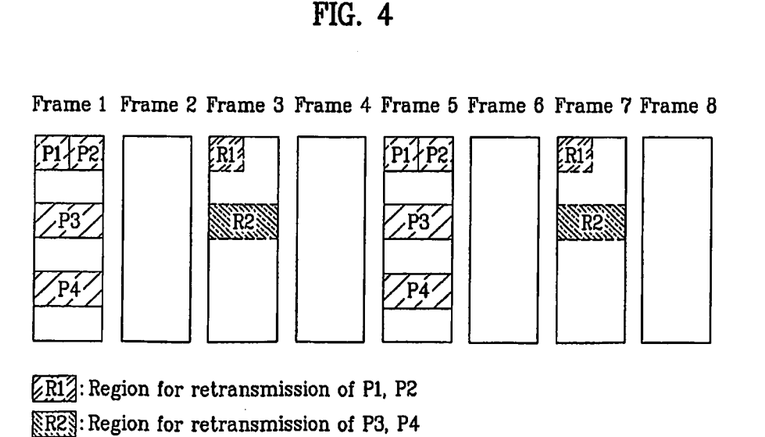
FIG. 4 is a diagram for a method of allocating a radio resource region for retransmission from a base station to a mobile station according to another embodiment of the present invention.

FIG. 4 is a diagram for a method of allocating a radio resource region for retransmission from a base station to a mobile station according to another embodiment of the present invention.

In FIG. 4, a horizontal axis indicates a time unit as a frame unit and a vertical axis indicates a frequency unit. 'P1' in Frame 1 or Frame 5 indicates a region allocated to a first mobile station by a base station for a continuous VoIP packet transmission/reception to/from the first mobile station in downlink/up link. 'P2' indicates a radio resource region allocated to a second mobile station by the base station, 'P3' indicates a radio resource region allocated to a third mobile station by the base station, and 'P4' indicates a radio resource region allocated to a fourth mobile station by the base station.

Referring to FIG. 4, in downlink, the base station transmits a VoIP packet to the mobile station via the allocated region. In uplink, the mobile station transmits a VoIP packet to the base station via the allocated region. In particular, the first mobile station transmits VoIP packets with the base station via P1. And, the rest of the mobile stations transmit/receive VoIP packets to/from the base station via the allocated regions, respectively.

In FIG. 4, assume that a region allocated to a mobile station to transmit VoIP packets is equal to the region shown in FIG. 3. Yet, FIG. 4 differs from FIG. 3 in allocating a retransmission region. The base station puts mobile stations having the same attribute (e.g., the same size of the resource region allocated for packet transmission) into one group and is then able to allocate a radio resource for retransmission. In particular, in case that the base station configures a retransmission region, mobile stations having the same resource allocation region size in the same frame into at least one or more groups and is then able to allocate a resource allocation region for retransmission to each of the groups.

Referring to FIG. 4, since a size of a radio resource region allocated to the first mobile station is equal to a size of a radio resource region allocated to the second mobile station, the first and second mobile stations can be put into one group. Since a size of a radio resource region allocated to the third mobile station is equal to a size of a radio resource region allocated to the fourth mobile station, the third and fourth mobile stations can be put into another group.

Hence, in Frame 3 or Frame 7, 'R1 (retransmission region allocated for retransmissions of regions P1 and P2)' is allocated as a retransmission region of the first and second mobile stations. And, 'R2 (retransmission region allocated for retransmissions of regions P3 and P4)' is allocated as a retransmission region of the third and fourth mobile stations.

In another embodiment of the present invention, when retransmission take place in all of the mobile stations having the same retransmission region allocated thereto, if VoIP packets are transmitted using the same retransmission regions, collisions may cause a problem that retransmission packets are unable to be normally retransmitted.

To solve this problem, one mobile station keeps using a previously allocated retransmission. Yet, it is necessary to allocate a region different from the previously allocated region to the other mobile station for retransmission.

For instance, assume that the first and second mobile stations transmit VoIP packets to the base station in uplink through P1 and P2, respectively. In this case, if both of the VoIP packets received by the base station through P1 and P2 are erroneous, the base station transmits NACK signals to the mobile stations to make requests for retransmissions of the corresponding packets, respectively. After the mobile stations have received the NACK signals, if the mobile stations simultaneously transmit retransmission packets via a fixed retransmission region R1, which was previously allocated by the base station through an initial control message, the retransmission packets may collide with one another.

Therefore, after a retransmission region is allocated per group, if errors simultaneously generated from mobile stations belonging to the same group, the base station needs to allocate a new retransmission region.

In particular, the first mobile station is made to retransmit a packet via R1 which is a retransmission region allocated via an initial control message and the second mobile station additionally transmits a control message for retransmission to allocate another resource region, which is not R1, for retransmission. Hence, it is ale to control mutual collision to be avoided.

Figure 5:
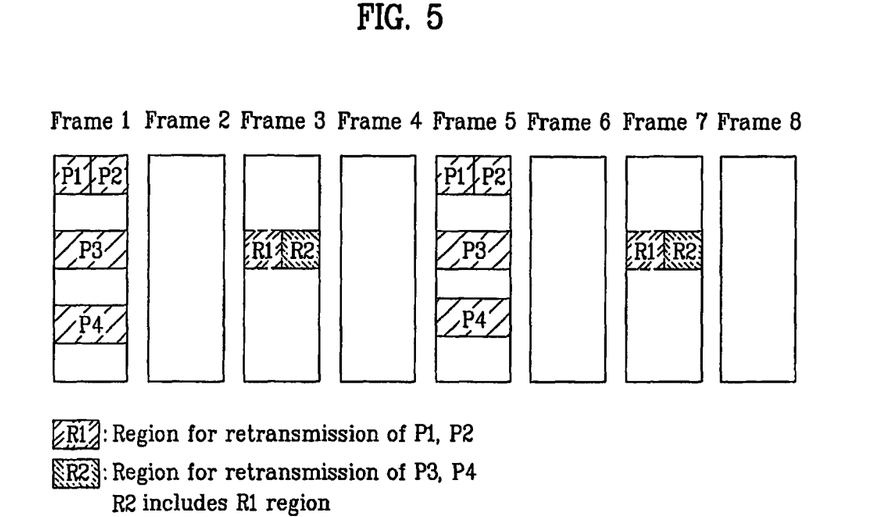
FIG. 5 is a diagram for a method of allocating a radio resource region for retransmission from a base station to a mobile station according to a further embodiment of the present invention.

FIG. 5 is a diagram for a method of allocating a radio resource region for retransmission from a base station to a mobile station according to a further embodiment of the present invention.

In FIG. 5, a horizontal axis indicates a time unit as a frame unit and a vertical axis indicates a frequency unit. 'P1' in Frame 1 or Frame 5 indicates a region allocated to a first mobile station by a base station for a continuous VoIP packet transmission to the mobile station in downlink or 'P1' in Frame 1 or Frame 5 indicates a region allocated to a first mobile station by a base station for a VoIP packet reception from the first mobile station in uplink. 'P2' indicates a radio resource region allocated to a second mobile station by the base station, 'P3' indicates a radio resource region allocated to a third mobile station by the base station, and 'P4' indicates a radio resource region allocated to a fourth mobile station by the base station.

Referring to FIG. 5, in downlink, the base station transmits a VoIP packet to the mobile station via the allocated region. In uplink, the mobile station transmits a VoIP packet to the base station via the allocated region. In particular, the first mobile station transmits VoIP packets with the base station via P1. And, the rest of the mobile stations transmit/receive VoIP packets to/from the base station via the allocated regions, respectively.

FIG. 5 shows that the base station transmits VoIP packets with each of the mobile stations by allocating radio resources to the respective mobile stations, which is as good as FIG. 3 or FIG. 4.

Yet, FIG. 5 differs from FIG. 3 or FIG. 4 in that mobile stations perform retransmission using a common retransmission channel (common ReTx channel) set for the retransmission instead of allocating retransmission regions to the mobile stations, respectively. In particular, after a common retransmission channel has been set as a resource region available for VoIP packet retransmission, it can be used in case of retransmission occurrence.

For instance, in case that retransmissions take place for at least two mobile stations in VoIP downlink, a base station selects one of the at least two mobile stations and then enables a packet to be retransmitted to the selected mobile station using a common retransmission channel. The base station enables a retransmission process to be performed by allocating a resource region designated in the same frame to the unselected mobile stations.

In case that retransmissions take place for at least two mobile stations in uplink, a base station designates a single mobile terminal to transmit a retransmission packet via a common retransmission channel in the same frame only and then notifies it to the mobile stations. To enable the unselected mobile stations to perform retransmissions, the base station can allocate a different region for retransmission in the same frame.

Referring to FIG. 5, mobile stations transmitting VoIP packets in the same frame use a common retransmission channel for retransmission. 'R1' indicates a resource region for allocating a portion of a common retransmission channel for retransmissions of P1 and P2. And, 'R2' indicates a resource region for allocating a portion of a common retransmission channel for retransmissions of P3 and P4. Moreover, a region of R2 can include a region of R1.

When retransmissions are generated from at least one or more mobile stations in uplink, if the at least one or more mobile stations perform retransmissions via the same retransmission region, collisions may occur. Hence, if retransmissions are generated from a plurality of mobile stations in case of using the same retransmission channel, a single mobile station performs a retransmission process (base station to mobile station in case of downlink, mobile station to base station in case of uplink) using the common retransmission channel only while the rest of the mobile stations are made to perform a retransmission process in a manner of allocating resource regions to the rest of the mobile stations, respectively.

In case that a retransmission is performed using a common retransmission channel, an unused region of the common retransmission channel is available for a transmission of other packets. For instance, in case that a retransmission is performed using a region R1, a base station is able to transmit VoIP packets using a different region not including a region R1 in a region R2.

The resource allocation for retransmission in FIGS. 3 to 5 can use the same region for initial transmission or a different region. If the same region for the initial transmission is used, packets can be just transmitted via a resource area equal to a previously allocated region without announcing resource allocation region information separately.

Figure 6:
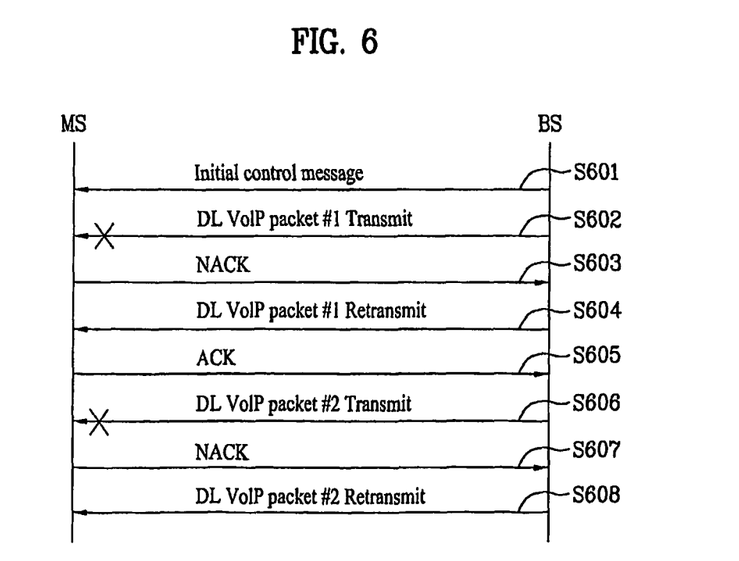
FIG. 6 is a flowchart for performing a retransmission using a continuous HARQ setting method in downlink according to one embodiment of the present invention.

FIG. 6 is a flowchart for performing a retransmission using a continuous HARQ setting method in downlink according to one embodiment of the present invention.

Referring to FIG. 6, a base station delivers information for retransmission to a mobile station using a initial control message [S601].

In the step S601, the initial control message for retransmission can include a specific UL/DL-MAP IE message, a DSA-REQ/RSP message, or another MAC management message according to system requirements. And, the information for the retransmission can include information on a fixed resource allocation region and MAC level information or a transmission timing point (e.g., information indicating that a retransmission will be performed after duration of prescribed frames from a timing point of NACK reception).

Preferably, the methods described with reference to FIGS. 3 to 5 are usable as a method of allocating a fixed radio resource region for retransmission. According to one embodiment of the present invention, a case of performing communication between a single mobile station and a base station is assumed. In case that communications are performed between at least one or more mobile stations and a base station, it is able to allocate a radio resource region for retransmission using one of the methods described with reference to FIGS. 3 to 5.

Referring to FIG. 6, the base station transmits DL VoIP packet #1 to the mobile station to provide a VoIP service thereto. Yet, if error is generated from the DL VoIP packet #1, the mobile station may not decode the corresponding packet [S602].

In this case, the mobile station is able to transmit a NACK signal to the base station to announce that error has been generated [S603].

Having received the NACK signal, the base station retransmits the DL VoIP packet #1 to the mobile station via a region allocated for retransmission without side information using the information on the resource allocation region previously negotiated with the mobile station in the step S601 [S604]. In this case, the mobile station is able to receive VoIP packet from the base station via a region allocated for a pre-designated retransmission.

Having received the VoIP packet normally, the mobile station transmits an acknowledgement (ACK) signal to the base station [S605].

To provide the VoIP service continuously, the base station transmits DL VoIP packet #2 to the mobile station [S606].

Yet, in case that the DL VoIP packet #2 transmitted in the step S606 is erroneous or lost on wire/wireless line, the mobile station is unable to receive the packet normally. Therefore, the mobile station transmits a NACK signal to the base station [S607].

Having received the NACK signal, the base station retransmits the DL VoIP packet #2 based on information on fixed resource allocation region, information on MCS level or retransmission timing point contained in the control message for the retransmission and the like [S608].

Figure 7:
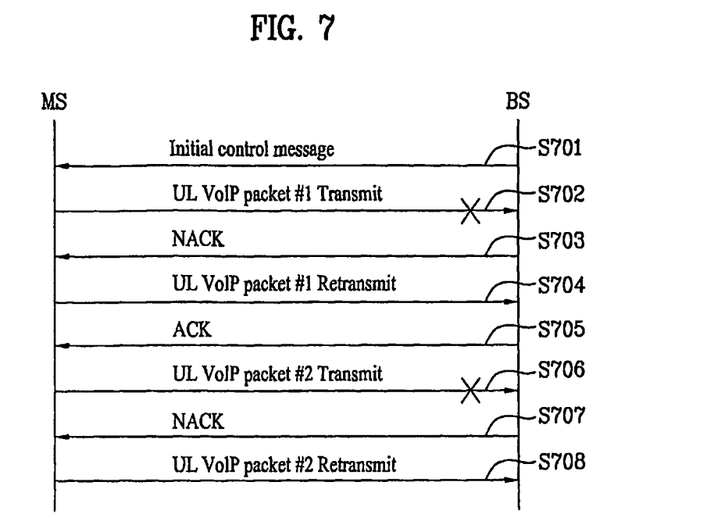
FIG. 7 is a flowchart for performing a retransmission using a continuous HARQ setting method in uplink according to another embodiment of the present invention.

FIG. 7 is a flowchart for performing a retransmission using a continuous HARQ setting method in uplink according to another embodiment of the present invention.

Referring to FIG. 7, a base station is able to deliver information on a resource allocation region for retransmission and the like using an initial control message for retransmission [S701].

In the step S701, the control message for retransmission can include a specific UL/DL-MAP IE message, a DSA-REQ/RSP message, or another MAC management message according to system requirements. And, the information for the retransmission can include information on a fixed resource allocation region and MAC level information or a transmission timing point (e.g., information indicating that a retransmission will be performed after duration of prescribed frames from a timing point of NACK reception).

Preferably, the methods described with reference to FIGS. 3 to 5 are usable as a method of allocating a fixed radio resource region for retransmission. According to another embodiment of the present invention, a case of performing communication between a single mobile station and a base station is assumed. In case that communications are performed between at least one or more mobile stations and a base station, it is able to allocate a radio resource region for retransmission using one of the methods described with reference to FIGS. 3 to 5.

Referring to FIG. 7, the mobile station transmits UL VoIP packet #1 to the base station to provide a VoIP service thereto. Yet, if error is generated from the UL VoIP packet #1, the base station may not decode the corresponding packet [S702].

In this case, the base station is able to transmit a NACK signal to the mobile station to announce that error has been generated [S703].

Having received the NACK signal, the mobile station retransmits the UL VoIP packet #1 to the base station via a region allocated for retransmission without side information using the information on the resource allocation region previously negotiated with the base station in the step S701 [S704]. In this case, the base station is able to receive VoIP packet from the mobile station via a region allocated for a pre-designated retransmission.

Having received the VoIP packet normally, the base station transmits an acknowledgement (ACK) signal to the mobile station [S705].

For the continuous VoIP service, the mobile station transmits UL VoIP packet #2 to the base station [S706].

Yet, in case that the UL VoIP packet #2 transmitted in the step S706 is erroneous or lost on wire/wireless line, the base station is unable to receive the packet normally. Therefore, the base station transmits a NACK signal to the mobile station [S707].

Having received the NACK signal, the mobile station retransmits the DL VoIP packet #2 based on information on fixed resource allocation region, information on MCS level or retransmission timing point contained in the control message for the retransmission and the like [S708].

In FIG. 6 and FIG. 7, in case that the mobile station and the base station need frequent transmissions and receptions of packets like the VoIP service, the base station sets a fixed resource allocation region for retransmission in advance and is then able to transmit it to the mobile station via the initial control message. Therefore, each time a retransmission is necessary, data packets can be efficiently transmitted by directly retransmitting the data packet via the pre-designated region without transmitting the control message for the retransmission. Since the base station needs not to transmit the control message to the mobile station in case of necessity of retransmission, it is able to reduce overhead of a MAC layer.

Figure 8:
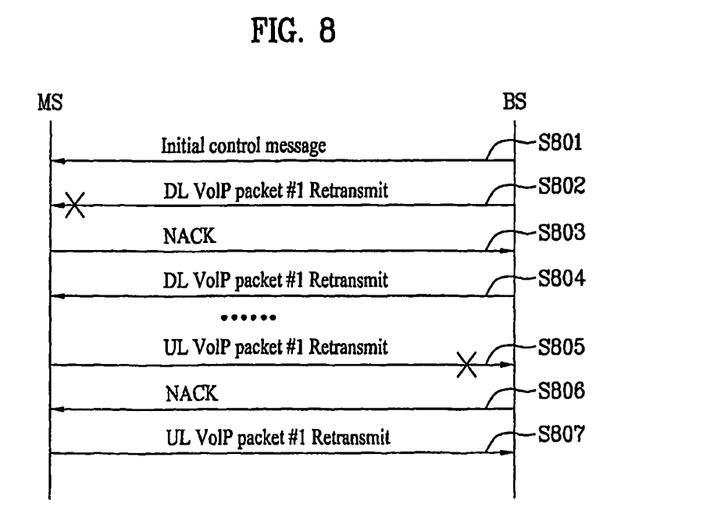
FIG. 8 is a flowchart of a packet error processing method in performing retransmission using a continuous HARQ setting method in downlink/uplink according to a further embodiment of the present invention.

FIG. 8 is a flowchart of a packet error processing method in performing retransmission using a continuous HARQ setting method in downlink/uplink according to a further embodiment of the present invention.

Referring to FIG. 8, a base station is able to deliver information on a resource allocation region for retransmission and the like using an initial control message for retransmission [S801].

In the step S801, the initial control message for retransmission can include a specific UL/DL-MAP IE message, a DSA-REQ/RSP message, or another MAC management message according to system requirements. And, the information for the retransmission can include information on a fixed resource allocation region and MAC level information or a transmission timing point (e.g., information indicating that a retransmission will be performed after duration of prescribed frames from a timing point of NACK reception).

Preferably, the methods described with reference to FIGS. 3 to 5 are usable as a method of allocating a fixed radio resource region for retransmission. According to a further embodiment of the present invention, a case of performing communication between a single mobile station and a base station is assumed. In case that communications are performed between at least one or more mobile stations and a base station, it is able to allocate a radio resource region for retransmission using one of the methods described with reference to FIGS. 3 to 5.

Referring to FIG. 8, in case that VoIP service is transmitted between the base station and the mobile station, it may frequently happen that VoIP packet is retransmitted. In FIG. 8, although the base station transmits a downlink packet DL VoIP packet #1, error is generated. Therefore, the base station retransmits the DL VoIP packet #1 to the mobile station via a pre-designated resource region using resource allocation region information contained in an initial control message. Yet, since the retransmitted DL VoIP packet #1 is erroneous or lost on wire/wireless line, it may happen that the mobile station is unable to receive the corresponding packet normally [S802].

If the case of the step S802 takes place, the mobile terminal transmits a NACK signal to the base station to announce that the packet was not normally received [S803].

Having received the NACK signal, the base station is able to retransmit the DL VoIP packet #1 to the mobile station using the information set for the retransmission in the initial control message [S804].

While the mobile station and the base station keep performing the VoIP service, an uplink communication for transmitting VoIP packet to the base station from the mobile station can be performed.

In the course of transmitting UL VoIP packet #1 to the base station from the mobile station, it may happen that the UL VoIP packet #1 is retransmitted. In this case, even if the UL VoIP packet #1 is retransmitted, error can be generated from the retransmitted packet again [S805].

If so, the base station retransmits the NACK signal to the mobile station to announce that the uplink packet having been transmitted by the mobile station is erroneous [S806].

Having received the NACK signal, the mobile station is able to retransmit the UL VoIP packet #1 to the base station using the resource allocation region information for the retransmission included in the initial control message and the like.

In FIG. 8, shown is the case that error is generated from VoIP packet retransmitted in uplink or downlink in the course of providing VoIP service to the mobile station from the base station. And, FIG. 8 depicts the case that the retransmission region allocated via the initial control message keeps being used despite that error keeps being generated from the retransmitted VoIP packet.

Yet, it may happen that the initially set retransmission region is not suitable for communication environment. In this case, by allocating a new retransmission region instead of a channel having error kept being generated therefrom, packets are transmitted via the new retransmission region to achieve a better gain in aspect of data processing efficiency.

Figure 9:
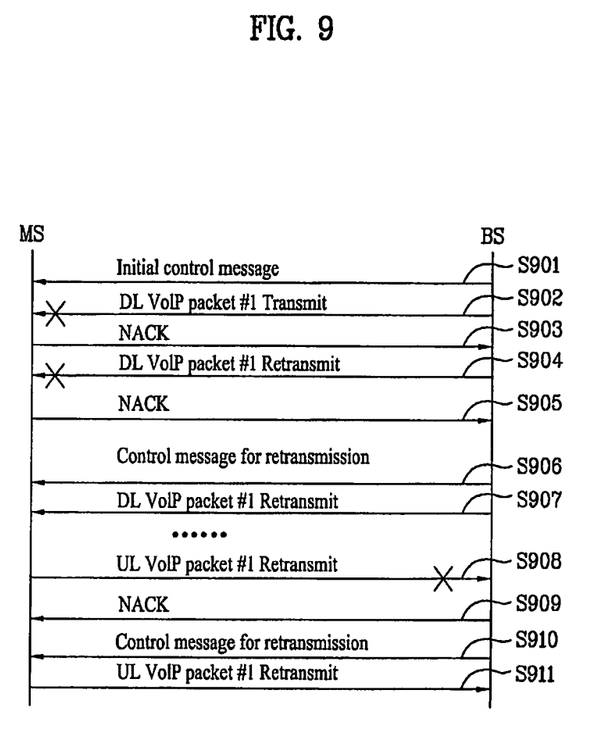
FIG. 9 is a flowchart of a packet error processing method in case of detecting error repeatedly in performing retransmission using a continuous HARQ setting method in downlink/uplink according to a further embodiment of the present invention.

FIG. 9 is a flowchart of a packet error processing method in case of detecting error repeatedly in performing retransmission using a continuous HARQ setting method in downlink/uplink according to a further embodiment of the present invention.

Referring to FIG. 9, a base station is able to inform a mobile station of retransmission region information in advance in a manner of continuous resource allocation information for retransmission is made to be included in an initial control message [S901].

In the step S901, the information required for the retransmission may include information on a fixed resource allocation region and MAC level information or a transmission timing point (e.g., information indicating that a retransmission will be performed after duration of prescribed frames from a timing point of NACK signal reception).

To prepare for a case that error keeps being generated despite performing a retransmission via a new transmission region, the base station is able to negotiate a prescribed count for receiving a NACK signal repeatedly with the mobile station. If the base or mobile station receives the NACK signal over the prescribed count, the base station is able to transmit a control message for allocating a new retransmission region again.

According to a further embodiment of the present invention, assume that the prescribed count for receiving the NACK signal is set to 2. Of course, the prescribed count for receiving the NACK signal may vary according to system requirements or communication environment.

Preferably, the methods described with reference to FIGS. 3 to 5 are usable as a method of allocating a fixed radio resource region for retransmission. According to a further embodiment of the present invention, a case of performing communication between a single mobile station and a base station is assumed. In case that communications are performed between at least one or more mobile stations and a base station, it is able to allocate a radio resource region for retransmission using one of the methods described with reference to FIGS. 3 to 5.

Referring to FIG. 9, in downlink transmission, the base station transmits DL VoIP packet #1 to the mobile station. Yet, it may happen that the DL VoIP packet #1 is erroneous or lost on wire/wireless line [S902].

If the mobile station is unable to normally know the information included in the packet as the received packet is erroneous or if the mobile station is unable to receive the packet that is lost, the mobile station transmits a NACK signal to the base station to announce the reception failure [S903].

Having received the NACK signal, the base station is able to retransmit the DL VoIP packet #1 via a preset retransmission region using the resource allocation region information included in the initial control message [S904]. Yet, if the retransmitted VoIP packet is erroneous as well, the mobile station transmits a NACK signal to the base station again [S905].

As the count of the NACK signal received by the base station from the mobile station becomes 2, the count negotiated with the mobile station in the initial service setting is met. Therefore, the base station transmits a control message for retransmission to the mobile station to allocate a new retransmission region again [S906]. In the control message to allocate the retransmission region in the step S906, information on a new retransmission region, MCS level information or information or a transmission timing point can be included.

The base station allocates a new retransmission region to the mobile station via the control message in the step S906 and is then able to retransmit the DL VoIP packet #1 again [S907]. In case of receiving the DL VoIP packet #1 normally, the mobile station transmits an ACK signal to the base station to announce the transmission success.

In the course of transmitting or receiving the VoIP service, it may happen that a data packet is transmitted in uplink. In particular, while the mobile station transmits VoIP packet to the base station, it may happen that UP VoIP packet #1 is retransmitted to the base station [S908].

Yet, if the VoIP packet retransmitted in the step S908 becomes erroneous, the base station transmits NACK signal to the mobile station to announce that the corresponding packet is erroneous [S909].

Having received the NACK signal in the step S909, the mobile station receives the NACK signal consecutively twice. Hence, the NACK signal reception count negotiated with the base station in the initial service configuration is met. In this case, since the base station already knows the fact that errors are at least twice generated from the received VoIP packet received from the mobile terminal, the mobile station is able to transmit a control message to allocate a new retransmission region to the mobile station despite an absence of a request made by the mobile station [S910].

Having allocated the new retransmission region thereto in the step S190, the mobile station is able to retransmit UL VoIP packet #1 to the base station [S911].

According to a further embodiment of the present invention, error occurs repeatedly even if the retransmission is performed by allocating the retransmission region in uplink or downlink. In this case, it is able to raise data processing efficiency in a manner of allocating a new retransmission region again and then transmitting VoIP packet via another channel instead of the channel on which the error keeps being generated.

Figure 10:
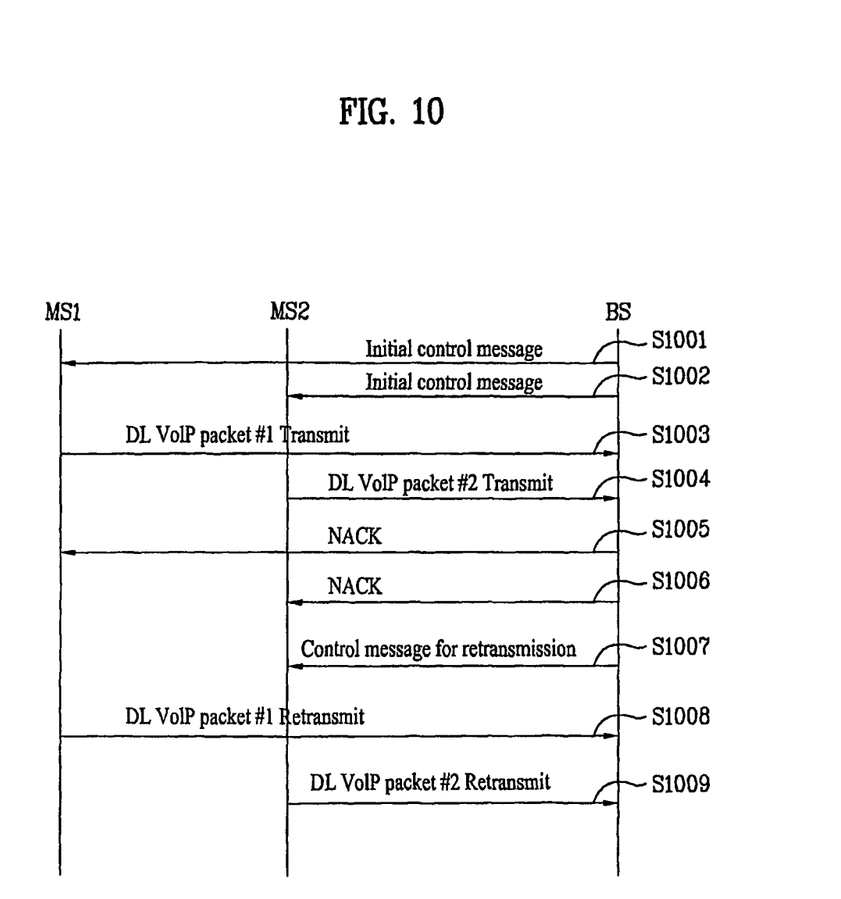
FIG. 10 is a flowchart for a method of performing retransmission in the course of transceiving VoIP service between a base station and at least one mobile station in uplink according to a further embodiment of the present invention.

FIG. 10 is a flowchart for a method of performing retransmission in the course of transceiving VoIP service between a base station and at least one mobile station in uplink according to a further embodiment of the present invention.

Referring to FIG. 10, a base station is able to provide VoIP service to at least one or more mobile stations existing within its service area. In this case, the base station is able to deliver information on resource allocation region for packet retransmission and the like to a first mobile station MS1 and a second mobile station MS2 among a plurality of the mobile stations using an initial control message for retransmission [S1001, S1002].

In the step S1001 or S1002, the initial control message for retransmission can include a specific UL/DL-MAP IE message, a DSA-REQ/RSP message, or another MAC management message according to system requirements. And, the information for the retransmission can include information on a fixed resource allocation region and MAC level information or a transmission timing point (e.g., information indicating that a retransmission will be performed after duration of prescribed frames from a timing point of NACK reception). Preferably, the methods described with reference to FIG. 4 and FIG. 5 are usable as a method of allocating a fixed radio resource region for retransmission.

According to a further embodiment of the present invention, the base station puts the first mobile station MS1 and the second mobile station MS2, which have the same attribute (e.g., equal size in an allocated resource region), into a group. The base station then allocates a same retransmission region to both of the first mobile station MS1 and the second mobile station MS2 or designates a common retransmission channel for VoIP packet retransmission.

The first mobile station MS1 transmits UL VoIP packet #1 to the base station for the VoIP packet transmission [S1003]. And, the second mobile station MS2 transmits UL VoIP packet #2 to the base station for the VoIP packet transmission [S1004]. Yet, if the UL VoIP packet #1 or the UL VoIP packet #2 is erroneous, it may happen that the base station is unable to reconstruct the corresponding packet.

The base station informs the first mobile station MS1 or the second mobile station MS2 that the corresponding uplink packet is erroneous [S1005, S1006].

In case that both of the first mobile station MS1 or the second mobile station MS2 perform retransmissions, as the same retransmission region is allocated to both of the first mobile station MS1 or the second mobile station MS2, it is unable to simultaneously transmit packets via the same region. In this case, the base station enables the first mobile station MS1 to retransmit the corresponding packet via the previously allocated retransmission region and should control the second mobile station MS2 to retransmit the corresponding packet via another retransmission region. Therefore, the base station is able to allocate a new retransmission region to the second mobile station MS2 via a control message for retransmission [S1007].

The first mobile station MS1 retransmits the UL VoIP packet #1 via the retransmission region previously allocated in the step S1001 [S1008]. And, the second mobile station MS2 retransmits the UL VoIP packet #2 via the retransmission region re-allocated in the step S1007 [S1009]. Thus, it is able to prevent the retransmitted packets from colliding with each other. Therefore, packet retransmissions can be more efficiently performed by avoiding collisions between the retransmitted packets.

Industrial Applicability

Accordingly, the embodiments of the present invention are applicable to various wireless access systems. Moreover, the embodiments of the present invention are applicable to every industrial field having the same or similar technical idea of the present invention or using the same.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

What is claimed is:

1. A method of retransmitting a voice over Internet protocol (VoIP) packet in a wireless access system, the method performed by a terminal and comprising:
    receiving a first control message including resource allocation information that indicates a first resource allocation region required for the VoIP packet retransmission, a modulation and coding scheme (MCS) level, and a transmission timing point for the VoIP packet retransmission that indicates a predetermined number of frames after receiving a non-acknowledgement (NACK) signal;
    transmitting the VoIP packet that is related to a service;
    retransmitting the VoIP packet via the indicated first resource allocation region, when the NACK signal is received, before a count of NACK signals received exceeds a predetermined count;
    receiving a second control message including resource allocation information that indicates a second resource allocation region required for the VoIP packet retransmission, when the count of NACK signals received exceeds the predetermined count; and
    retransmitting the VoIP packet via the indicated second resource allocation region,
    wherein the first resource allocation region and the second resource allocation region are used for transmitting another packet if the retransmission of the VoIP packet is unnecessary.

2. The method of claim 1, wherein the first control message further includes information indicating different resource allocation regions required for the VoIP packet transmission.

3. The method of claim 1, wherein the first control message further includes information for configuring at least one group including terminals having resource allocation regions that are equal in size to each other and further for indicating a resource allocation region required for the VoIP packet retransmission to the at least one group.

4. The method of claim 1, wherein the first control message further includes information for setting a retransmission-dedicated channel for the VoIP packet retransmission and further includes information of a specific region required for the VoIP packet retransmission in the retransmission-dedicated channel.

5. The method of claim 4, wherein the specific region required for the VoIP packet retransmission is a partial region of the retransmission-dedicated channel.

6. The method of claim 1, wherein:
    the first control message is an uplink MAP (UL MAP) message or a media access control (MAC) management message;
    and the MAC management message is at least a dynamic service addition message, a channel descriptor message, or a subscribe station basic capability message.

7. A method of retransmitting a voice over Internet protocol (VoIP) packet in a wireless access system, the method performed by a base station and comprising:
    transmitting a first control message including resource allocation information that indicates a first resource allocation region required for a VoIP packet retransmission, a modulation and coding scheme (MCS) level, and a transmission timing point for the VoIP packet retransmission that indicates a predetermined number of frames after receiving a non-acknowledgement (NACK) signal;
    transmitting the VoIP packet that is related to a service;
    retransmitting the VoIP packet via the indicated first resource allocation region, when the NACK signal is received, before a count of NACK signals received exceeds a predetermined count;
    transmitting a second control message including resource allocation information indicating a second resource allocation region required for the VoIP packet retransmission, when the count of NACK signals received exceeds the predetermined count; and
    retransmitting the VoIP packet via the indicated second resource allocation region, wherein the first resource allocation region and the second resource allocation region are used for transmitting another packet if the retransmission of the VoIP packet is unnecessary.

8. The method of claim 7, wherein the first control message further includes information indicating different resource allocation regions required for the VoIP packet transmission.

9. The method of claim 7, wherein:
the first control message further includes information for configuring at least one group including terminals having resource allocation regions equal in size to each other and further for indicating a resource allocation region required for the VoIP packet retransmission to the at least one group; and
the method further comprises transmitting the second control message when more than one retransmitted VoIP packet corresponding to the NACK signal is received at the same time.

10. The method of claim 7, wherein the first control message further includes information for setting a retransmission-dedicated channel for the VoIP packet retransmission and further includes information of a specific region required for the VoIP packet retransmission in the retransmission-dedicated channel.

11. The method of claim 10, wherein the specific region required for the VoIP packet retransmission is a partial region of the retransmission-dedicated channel.

12. The method of claim 7, wherein:
the transmitted first control message is a downlink MAP (DL MAP) message or a media access control (MAC) management message;
and the MAC management message is a dynamic service addition message, a channel descriptor message, or a subscribe station basic capability message.

* * * * *